United States Patent [19]

Wang

[11] Patent Number: 4,614,452
[45] Date of Patent: Sep. 30, 1986

[54] ANGLE ADJUSTING DEVICE

[76] Inventor: Cheng H. Wang, 9-3, Hai Wei Tze Lane, Chung Yang Rd., Chung Ho Tsun, Lung Ching Hsiang, Tai Chung Hsien, Taiwan

[21] Appl. No.: 584,444

[22] Filed: Feb. 28, 1984

[51] Int. Cl.[4] .......................... B25G 3/00; F16D 1/00
[52] U.S. Cl. ...................................... 403/27; 403/97; 403/146
[58] Field of Search ............................ 403/97, 27, 146

[56] References Cited

U.S. PATENT DOCUMENTS

| 1,697,710 | 1/1929  | Bostroem  | 403/97   |
| 2,410,088 | 10/1946 | Lundquist | 403/97   |
| 3,950,027 | 4/1976  | Wilson    | 403/97 X |
| 4,363,561 | 12/1982 | Hsieh     | 403/97 X |

FOREIGN PATENT DOCUMENTS 853235 11/1960 United Kingdom ................ 403/97

Primary Examiner—Andrew V. Kundrat
Attorney, Agent, or Firm—Fitzpatrick, Cella, Harper & Scinto

[57] ABSTRACT

An angle adjusting device for adjusting the relative positions of musical instruments, such as a bass drum and jazz tomtom. The angle adjusting device has two rods for holding the musical instruments separately. Each rod has a head which includes an annular inclined toothed portion. A wing nut mounted on one end of the axle and a lever having a cam surface for abutting against the wall of either one of the heads, through which full engagement, partial engagement and disengagement can be accurately set. Thus, rotation of one head relative to the other to adjust the angle of two rod can be implemented simply by singlehanded actuation of the lever.

3 Claims, 3 Drawing Figures

ANGLE ADJUSTING DEVICE

BACKGROUND OF THE INVENTION

The present invention is related to an angle adjusting device, and particualry is related to an angle adjusting device adapted to regulate the relative positions of two musical instruments, such as a bass drum and jazz tomtom.

A prior angle adjusting device for regulating the relative position of the bass drum to a jazz tomtom shown in FIG. 1 includes two rods 6 and 7 with two heads 8 and 9. There are two toothed portions 4 and 5 capable of meshing with each other disposed respectively in the heads 8 and 9. A bolt 1 and a wing nut 2 are provided for engaging and disengaging the two toothed portions 4 and 5. Through the engagement and disengagement of the two toothed portions 4 and 5, the angle of the two rods can be altered, and the distance between two drums can be adjusted. However, in view of the difficulty of determining the extent of the interengagement of the two toothed portions, a task which prolongs the time required for carrying out the adjustment of the angle, and further due to the fact that two heads are loosely mounted on the bolt 1, the procedure for adjusting the two rods so they are displaced at a preferred angle is tedious. This situation becomes much worse when the two musical instruments are heavier. In addition, many times the wing nut 2 will even slip off the bolt while loosening.

SUMMARY OF THE INVENTION

It is an object of the present invention to provide an angle adjusting device, in which the engagement and disengagement of the two toothed portions can be implemented by a simple singlehanded operation of a lever.

It is another object of the present invention to provide an angle adjusting device which can satisfactorily prohibit the nut from incidentally slipping off the axle.

It is a further object of the present invention to provide an angle adjusting device, the adjusting operation of which can be executed without complete disengagement of the two meshed toothed portions.

In accordance with the present invention, an angle adjusting device includes a first rod and a second rod adapted to respectively hold instruments, and each rod has a respective head, herein identified as first head and second head. The first head includes a first annular toothed portion to mesh with a second annular toothed portion provided in the second head. A first through hole and a second through hole are separately disposed in the first and second heads, and are provided separately coaxial to the first and second annular toothed portions. The first annular toothed portion is biassed away from the second annular toothed portion. A fastening member mounted on the first end of an axle to hinder the first head from slipping off the axle and a lever pivoted with the other end of the axle includes a cam surface abutting against the second head for varying the axial position of the axle relative to the second head. Thus with the cooperation of the fastening member, the variation of the position of the axle relative to the second head will drive the second annular toothed portion to engage or disengage the first annular toothed portion.

In accordance with one aspect of the present invention, the teeth of the first annular toothed portion and the second annular toothed portion are inclined in one direction.

In accordance with another aspect of the present invention, the first end is threaded and the fastening member is a nut member for screwing on the first end.

In accordance with a further aspect of the present invention, the cam surface includes a segment to abut against the second end for driving the first annular inclined toothed portion to partly engage with said second annular inclined toothed portion, and a second spring for slightly biassing the first annular inclined toothed portion toward the second annular inclined toothed portion when the first and second toothed portions partly engage, so as to permit uni-directional adjustment of the angle between the first rod and the second rod.

In accordance with still another aspect of the present invention, the outer wall of the second head has an annular recess coaxial with said second through hole, and a second spring disposed between the annular recess and the cam surface of the lever for biassing the lever from the second head.

In accordance with still further aspect of the present invention, the axle has an axial key and a nut member which includes a third annular toothed portion disposed transversely to the threaded surface of the nut member, and further comprises a restricting member having a fourth annular toothed portion to mesh with the third annular toothed portion; a through hole coaxial to the fourth annular toothed portion; and a key axially disposed on the inner surface of the through hole for being received into the key way. Thus, at the moment the nut member is screwed down to drive the first annular toothed portion to engage the second annular toothed portion, the third annular toothed portion will engage the fourth annular toothed portion and bring the axle as well as the lever to rotate relative to the first and second head so that the operation of the lever will not affect the original set position of the nut member relative to the axle.

The presently preferred exemplary embodiments will be described in detail with respect to the following drawing, in which:

DETAILED DESCRIPTION OF THE PREFERRED EMBODIMENTS

Figure 1:
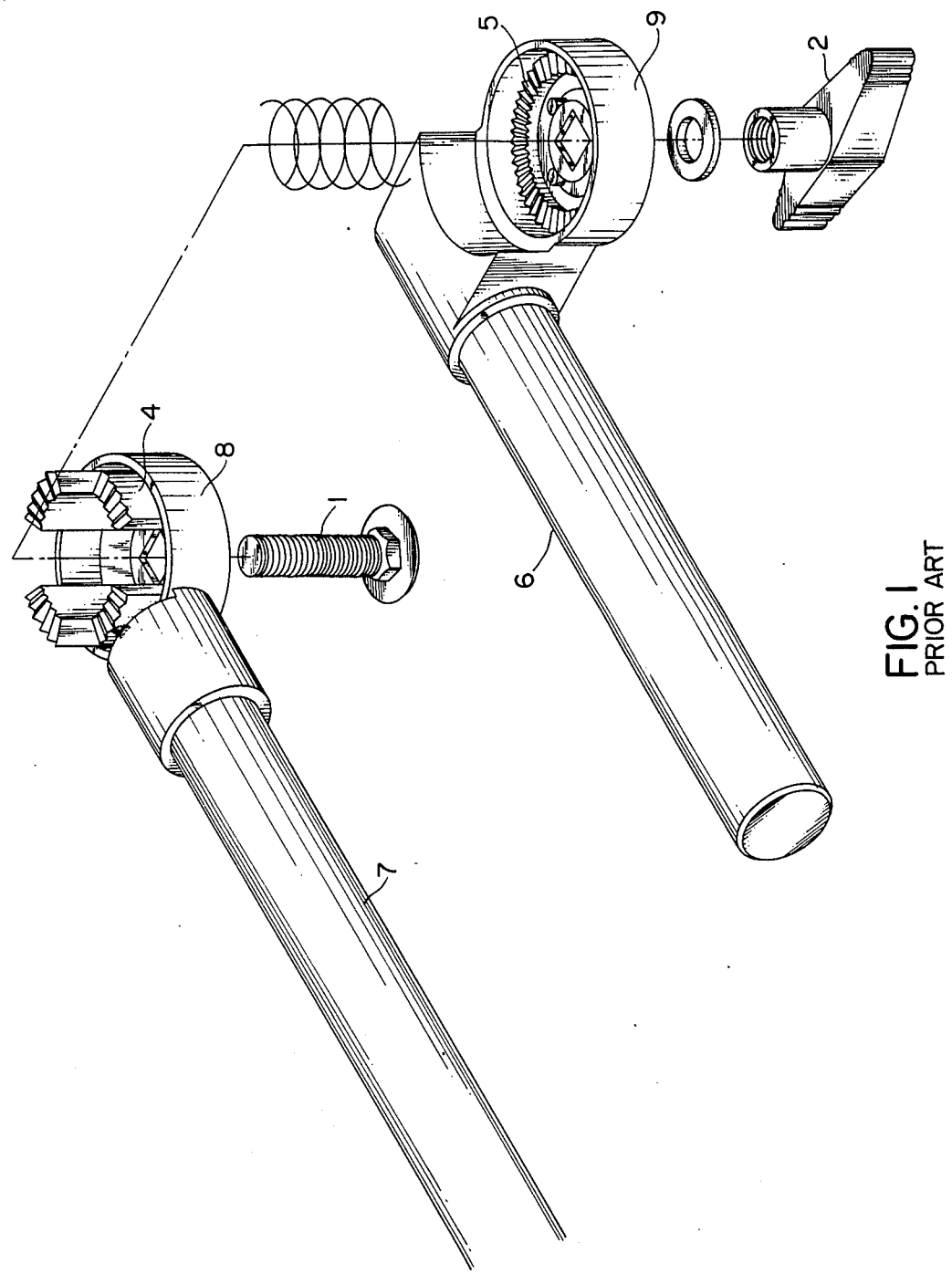
FIG. 1 is an exploded perspective view of a prior art.
Figure 2:
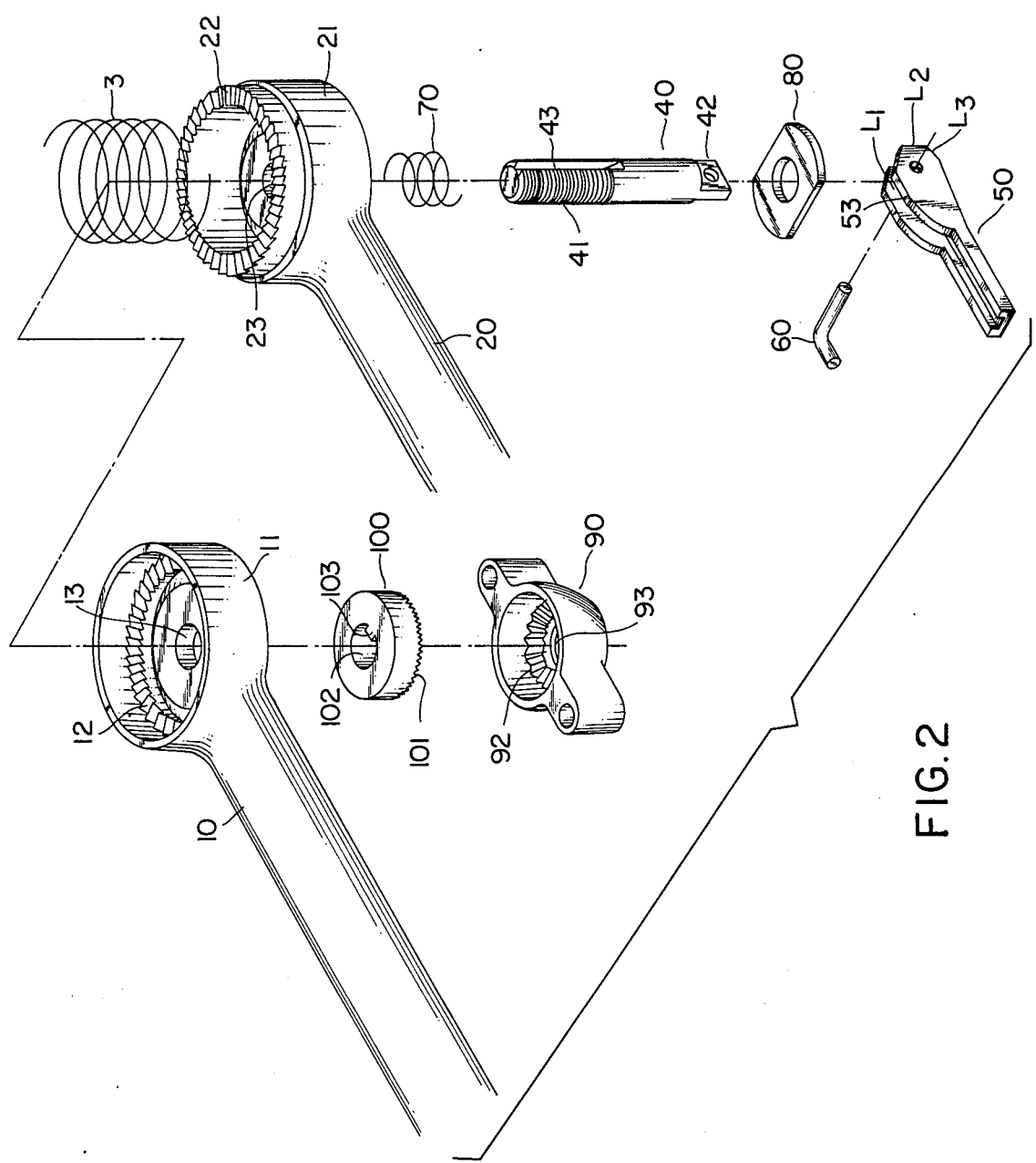
FIG. 2 is an exploded perspective view of an embodiment according to the present invention.
Figure 3:
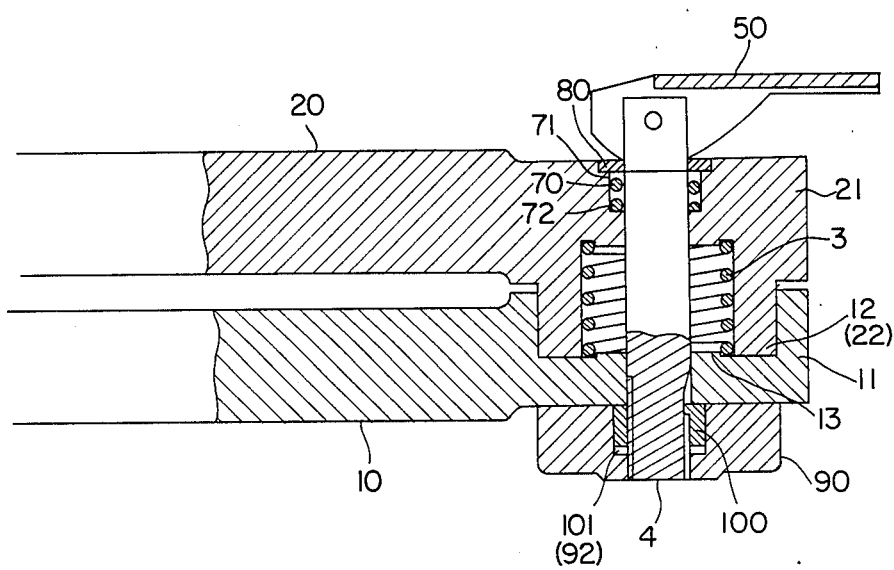
FIG. 3 is a partly sectional view of the embodiment as shown in FIG. 2.

As shown in FIGS. 2 and 3, there is shown an angle adjusting device which includes a first rod 10 having a first head 11, and a second rod 20 having a second head 21. A first annular toothed portion 12 and a second annular toothed portion 22 are respectively disposed in the first head 11 and the second head 21. Preferably, the first head 11 is formed into cap shape for a fit covering the second head 22. A first through hole 13 and a second through hole 23 separately disposed in the first head 11 and the second head 21 are coaxial to the first annular toothed portion 12 and the second annular toothed portion 22 respectively. A spring member 3 interposed between the first head 11 and the second head 21 constantly biasses the first annular toothed portion 12 away from the second annular toothed portion 22. An axle 40 has a first threaded end 41 for mounting a wing nut 90, and a tongue end 42 for pivotably anchoring a lever 50 with a pin 60. The wing nut 90 mounted on the axle 40 with its tap hole 93 is used to prevent the first head 11 from slipping off the axle 40 while determining, with the cooperation of the lever 50, the relative positions of the first and second heads 11 and 12 on the axle 40. The functions of adjusting the first and second annular toothed portion in full engagement, partial engagement, and disengagement will be described hereafter.

Preferably, the wing nut is provided with a third annular toothed portion 92 which is transverse to the tap hole 93 and meshes with a fourth annular toothed portion 101 of a restricting member 100. The restricting member 100 has a fourth through hole 102 which is coaxial with the fourth annular toothed portion 101. On the inner surface of the fourth through hole 102, an axial key 103 is disposed for inserting in an axial key way 43 to impart the rotation of the wing nut 90 to the axle 40 when the third and fourth annular toothed portions are meshed. The lever 50 which is pivoted at the tongue end 42 has a cam surface for abutting against the outer wall of the second head 21 through a washer 80. As is more clearly shown in FIG. 3, the washer 80 sleeves the tongue end 42 and seats on a shoulder portion 71 of a recess 72. By means of a second spring 70 which is received in the recess 72, the lever 50 is biassed away from the second head 21. The cam surface 53 is divided into three segments, i.e., the first segment L 1, the second segment L 2 and the third segment L 3 for separately dictating the full engagement, partial engagement and disengagement of the first annular toothed portion 12 with the second annular toothed portion 22.

The operation of accurately determining the positions of the full engagement, partial engagement and disengagement is described as follows. The first segment L 1 is in the first place turned to abut against the shoulder portion 71 of the recess by means of the washer 80. Then the wing nut 90 is turned to move axially along the axle 40. Once the first annular toothed portion 12 is almost brought into meshing position with annular toothed portion 22, the third annular toothed portion 92 will mesh with the fourth annular toothed portion 101 as wing nut 90 continues to be turned so that the restricting member 100 will retate due to cooperation of the key 103 and the key way 43 and the meshing of the third and fourth annular toothed portions 92 and 101. The axle 40 will turn when the member 101 is turned by wing nut 90 so as to cause the lever 50 to turn together with the axle 40. The turning of the lever 50 with the axle also acts as a signal to show that the desired meshing between the first and second annular toothed portions has been reached. Subsequently, when the lever is shifted to bring the second segment L 2 to abut against the shoulder portion 71, the first spring 3 will bias the second annular toothed portion 22 away from the first annular toothed portion 12 to an extent that the two annular toothed portions 12 and 22 are only partially engaged, a position which is dictated by the distance between the second segment and the pivot point. In case the teeth of the two annular toothed portions are inclined in one direction, the partial engagement will permit uni-directional rotation of the first head 11 relative to the second head 22 so as to adjust the angle of the two rods 10 and 20. When the lever 50 is turned to bring the third segment L3 to abut against the shoulder portion 71, the two annular toothed portions 12 and 22 will be in full disengagement so that the rotation of the first end 11 relative to the second end 22 can be carried out in either direction so as to freely adjust the angle of the two rods 10 and 20. It is noted that during the operation of the unidirectional rotation when the two annular toothed portions 12 and 22 are in partial engagement, the second head is slightly forced against the second spring 70 so as to slide over the tip of each inclined tooth.

While the invention has been described in connection with what is presently considered to be the most practical invention it is not to be limited to the disclosed embodiments, but on the contrary, is intended to cover various modifications and equivalent arrangements included within the spirit and scope of the appended claims which scope is to be accorded the broadest interpretation so as to encompass all such modifications and equivalent structures.

What I claim is:

1. An angle adjusting device comprising:
a first rod having a first head, said first head having a first annular toothed portion, and a first through hole coaxial with said first annular toothed portion;
a second rod having a second head, said second head having a second annular toothed portion for meshing said first annular toothed portion, and a second through hole coaxial with said second annular toothed portion;
a first spring member disposed between said first head and said second head for biasing said second annular toothed portion from said first annular toothed portion;
an axle having a first end and a second end;
a fastening member mounted on said first end of said axle to hinder said first head from slipping off said axle;
a lever pivoted with said second end including a cam surface abutting said second head for varying the axial position of said axle relative to said second head, whereby through cooperation with said fastening member, a variation of the relative position of said axle to said second head will drive said second annular toothed portion to engage or disengage said first annular toothed portion, wherein the teeth of said first annular toothed portion and said second annular toothed portion are inclined in one direction and said cam surface includes a segment to abut said second end for driving said first annular inclined toothed portion to partly engage with said second annular inclined toothed portion, and further comprising a second spring member disposed to slightly bias said first annular toothed portion toward said second annular toothed portion when said first and second annular toothed portion are partially engaged so as to permit uni-directional adjustment of angle between said first rod and said second rod.

2. An angle adjusting device comprising:
a first rod having a first head, said first head having a first annular toothed portion, and a first through hole coaxial with said first annular toothed portion;
a second rod having a second head, said second head having a second annular toothed portion for meshing said first annular toothed portion, and a second through hole coaxial with said second annular toothed portion;

a first spring member disposed between said first head and said second head for biasing said second annular toothed portion from said first annular toothed portion;

an axle having a threaded first end and a second end;

a fastening member constituted by a nut member screw threaded on said first end of said axle to hinder said first head from slipping off said axle; and a lever pivoted with said second end including a cam surface abutting said second head for varying the axial position of said axle relative to said second head, whereby through cooperation with said fastening member, a variation of the relative position of said axle to said second head will drive said second annular toothed portion to engage or disengage said first annular toothed portion; and wherein said axle has an axial key way and said nut member includes a third annular toothed portion disposed transversely to the threaded surface of said nut member, and further comprising a restricting member having a fourth annular toothed portion to mesh with said third annular toothed portion; a through hole coaxial to said fourth annular toothed portion; and a key axially disposed on the inner surface of said through hole for being received in said key way, whereby at the moment the nut member is screwed down to drive said first annular toothed portion to engage said second annular toothed portion, said third annular toothed portion will engage said fourth annular toothed portion and bring said axle as well as said lever to rotate relative to said first and second head so that the operation of said lever will not affect the original set position of said nut member relative to said axle.

3. An angle adjusting device comprising:

a first rod having a first head, said first head having a first annular toothed portion, and a first through hole coaxial with said first annular toothed portion;

a second rod having a second head, said second head having a second annular toothed portion for meshing said first annular toothed portion, and a second through hole coaxial with said second annular toothed portion;

a first spring member disposed between said first head and said second head for biasing said second annular toothed portion from said first annular toothed portion;

an axle having a first end and a second end;

a fastening member mounted on said first end of said axle to hinder said first head from slipping off said axle;

a lever pivoted with said second end including a cam surface abutting said second head for varying the axial position of said axle relative to said second head, whereby through cooperation with said fastening member, a variation of the relative position of said axle to said second head will drive said second annular toothed portion to engage or disengage said first annular toothed portion, wherein the teeth of said first annular toothed portion and said second annular toothed portion are inclined in one direction and said cam surface includes a segment to abut said second end for driving said first annular inclined toothed portion to partly engage with said second annular inclined toothed portion, and further comprising a second spring member disposed to slightly bias said first annular toothed portion toward said second annular toothed portion when said first and second annular toothed portion are partially engaged so as to permit unidirectional adjustment of angle between said first rod and said second rod, the outer wall of said second head having an annular recess coaxial with said second through hole, and said second spring being disposed between asid annular recess and said cam surface of said lever for biasing said lever from said second head.

* * * * *